United States Patent [19]
Tousson

[11] Patent Number: 5,708,367
[45] Date of Patent: Jan. 13, 1998

[54] DIGITAL POSITION SENSOR

[76] Inventor: Eliahou Tousson, 13843 Oxnard St. #54, Van Nuys, Calif. 91401

[21] Appl. No.: 500,029

[22] Filed: Jul. 10, 1995

[51] Int. Cl.$^6$ ................................................. G01R 27/26
[52] U.S. Cl. ........................... 324/660; 324/686; 324/690
[58] Field of Search ................................. 324/658, 660, 324/661, 662, 686, 687, 690

[56] References Cited

U.S. PATENT DOCUMENTS

| | | | |
|---|---|---|---|
| Re. 34,741 | 9/1994 | Andermo | 324/690 |
| 3,296,522 | 1/1967 | Wolfendale | 324/660 X |
| 3,348,133 | 10/1967 | Wolfendale | 324/660 |
| 4,638,670 | 1/1987 | Moser | 324/660 X |
| 4,959,615 | 9/1990 | Andermo | 324/690 |
| 5,391,992 | 2/1995 | Adachi | 324/660 |
| 5,534,859 | 7/1996 | Meyer | 324/660 X |

Primary Examiner—Glenn W. Brown
Attorney, Agent, or Firm—Herbert M. Shapiro

[57] ABSTRACT

A sensor for providing an indication of the movement of one component of a system with respect to another includes a plurality of discrete electrodes and a common electrode affixed to the non-moving component along the axis of movement of the moving component and a pointer affixed to the moving component also along the axis of movement. As the moving component moves, it positions the pointer at consecutive ones of the plurality of discrete electrodes forming a capacitor structure with each in succession. When interrogated, the capacitor provides a signal indicative of the position of the moving component. The sensor is useful for indicating linear movement, angular displacement and pressure, strain and temperature when adapted to structures which indicate such parameters as a function of displacement. Alternative structures include "Bar Codes" with a laser as a pointer and magnetic stripes with a magnetic read head as the pointer. The output of the sensor may be employed as a feedback signal to a position controller for, for example, a computer-driven machine tool or for a digital hydraulic control system.

5 Claims, 3 Drawing Sheets

5,708,367

1

DIGITAL POSITION SENSOR

FIELD OF THE INVENTION

This invention relates to a digital position sensor and more particularly, to such a sensor useful to indicate, for example, the displacement of a piston in a cylinder or the angle of rotation of a shaft.

BACKGROUND OF THE INVENTION

Digital sensors are well known in the art for sensing the level of a fluid. U.S. Pat. No. 5,138,880 for example, discloses a level sensing probe with two concentric cylinders. The probe is formed with a set of capacitors and employs the fluid to be measured as the dielectric. The capacitors are arranged along the axis to he measured, each capacitor representing a discrete level increment and is assigned a unique time slot in a switching sequence. In operation, an AC signal is applied across each capacitor (in it's time slot) and the result is compared with the inverted signal applied across the first level capacitor. A logic "1" results when the fluid is present at the interrogated capacitor. All the capacitors are grounded except the reference and the interrogated capacitor.

U.S. Pat. No. 3,935,739 also discloses a level sensing capacitive probe with a common electrode and individual opposing electrodes. An AC signal is impressed on all the capacitive elements simultaneously and the presence of the fluid (dielectric) material yields a current at each capacitor which is greater than the current produced in the absence of the fluid. The AC currents are rectified or summed to produce an analog output representing the height of the fluid column measured.

U.S. Pat. No. 3,343,415 discloses a cylindrical capacitor with a common inner electrode and discrete electrodes spaced apart along the vertical axis of the fluid column measured. The signal output from two adjacent capacitors are compared. If both were immersed in fluid or if both were above the fluid, the outputs would be the same. If only one were immersed, the outputs would be different providing an indication of the fluid level.

BRIEF DESCRIPTION OF THE INVENTION

The invention is based on the recognition that a set of discrete sensors such as the electrodes of a capacitor of the above-noted fluid level sensors could be used to determine, for example, the angular displacement of a shaft or the displacement of a piston in a cylinder in the absence of a fluid. If, for example, the discrete electrodes were disposed along the axis of a non-moving component, such as on the inner surface of a cylinder and a common electrode were disposed on the outer surface of the moving component, such as the piston, a pointer extending from the common electrode to the discrete electrodes would provide a moving electrode positioned by the movement of the moving component to successive ones of the discrete electrodes. The pointer forms a capacitor with the discrete electrode located at the position of the pointer, air between the discrete electrode and the pointer providing the dielectric. The discrete electrodes are operative as switches activated by the pointer.

For the determination of the angular displacement of, for example, a shaft such as in a throttle of an automobile, the discrete electrodes are arranged in an annular geometry about the inner surface of the throttle casing and the common electrode and the pointer are arranged in an annular

2 geometry about the outer surface of the throttle shaft. The rotation of the throttle moves the pointer to the position of consecutive discrete electrodes which produce characteristic signals representative of the position of the pointer.

The discrete electrodes may be arranged in a coded configuration which generates a code representative of the position of the moving component in response to the movement of the pointer to the position of the discrete electrode. In such an embodiment, the codes need not only be formed by electrode configurations but also can be formed to be read optically or magnetically. For example, instead of discrete electrodes, a set of bars such as a bar code can be formed on the moving piece part along the axis of movement. The bar code is read out by a laser as is now in common usage at super market check out counters.

Figure 1:
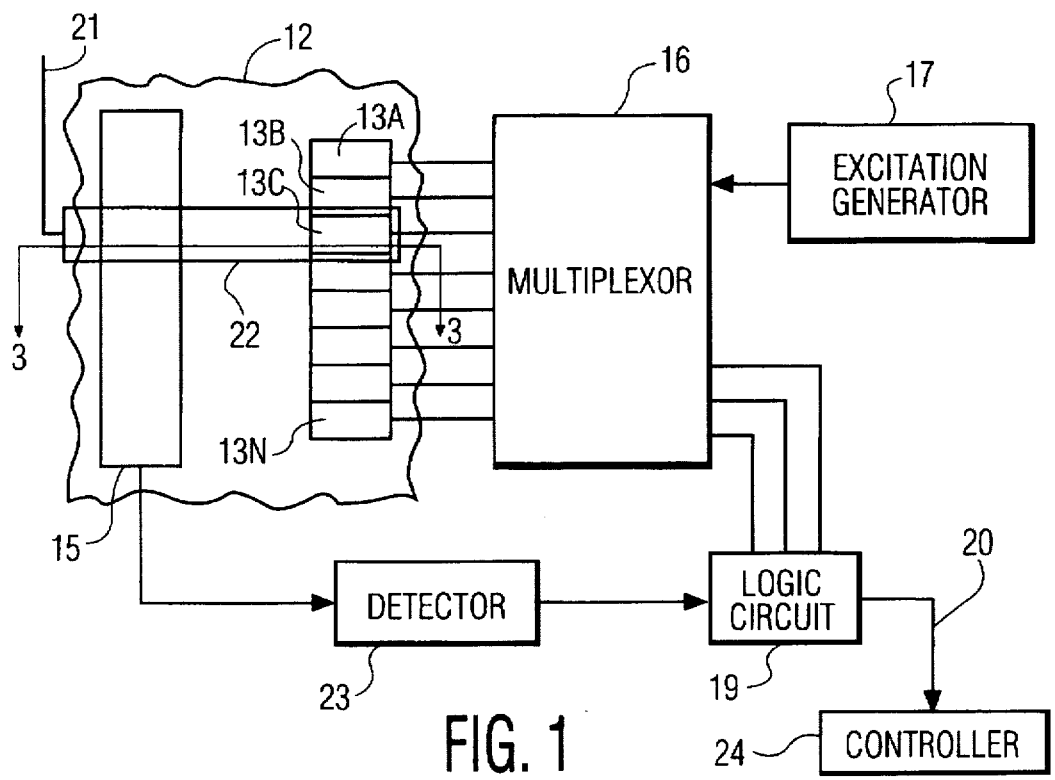
FIG. 1 is a schematic representation of a position sensing probe for linear displacement using a set of discrete electrodes and a common electrode with a pointer on a moving component in accordance with the principles of this invention.
Figure 2:
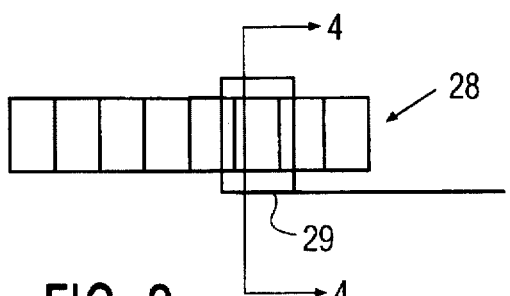
FIG. 2 is a schematic representation of an alternative displacement position sensing probe in accordance with the principles of this invention.
Figure 5:
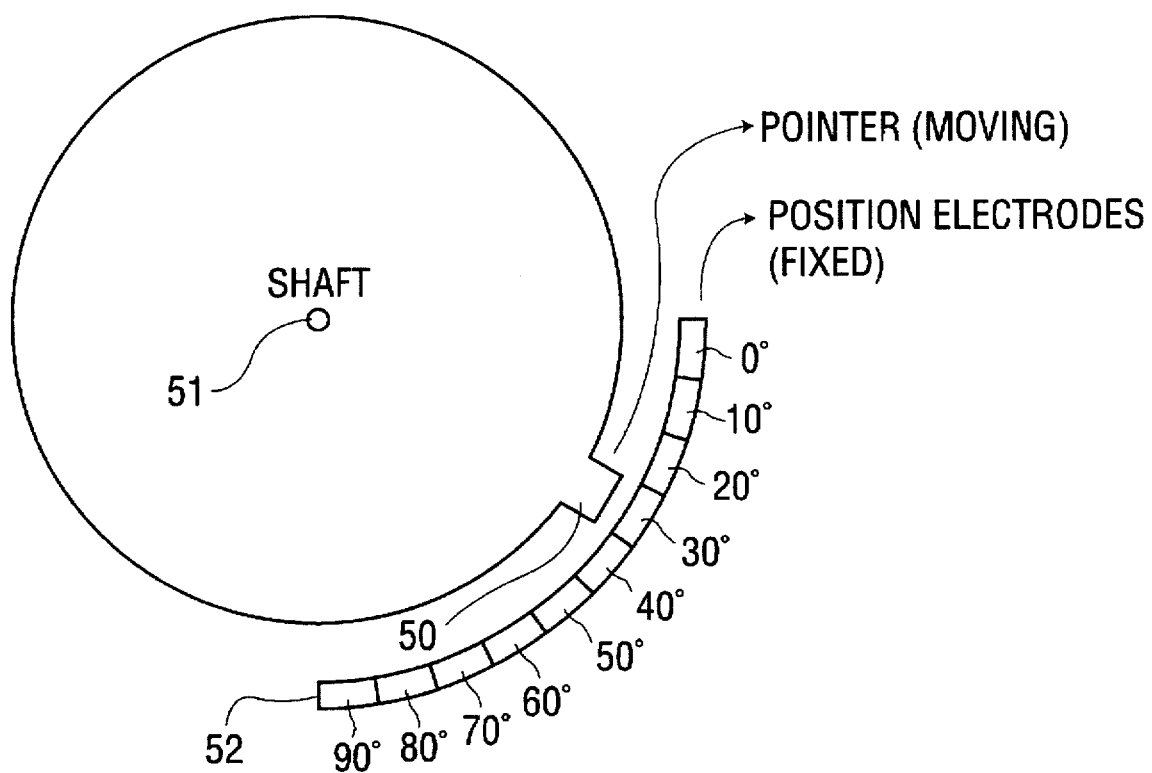
Figure 6:
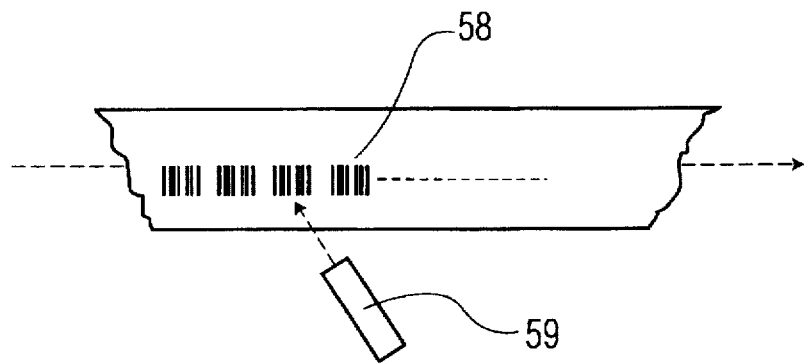

FIG'S. 3 and 4 are cross-section views of portions of the probes of FIGS. 1 and 2, respectively;

FIG. 5 is a schematic representation of an angular displacement position sensing probe in accordance with the principles of this invention;

FIG. 6 is a schematic view of an alternative embodiment in accordance with the principles of this invention; and FIG'S. 7 and 8 are schematic representations of alternative pressure sensors in accordance with the principles of this invention.

DETAILED DESCRIPTION OF ILLUSTRATIVE EMBODIMENTS OF THIS INVENTION

FIG. 1 shows an arrangement 10 in accordance with the principles of this invention in which, for example, a machine includes first and second components one of which moves with respect to the other and where the position of the moving component is to be determined. Such an arrangement is particularly useful in digital hydraulic control systems where the piston is driven to specified positions in a cylinder as, for example, in a computer-driven machine tool and the position of the piston at any given instant is fed back to the controller.

Specifically, FIG. 1 shows a portion of a stationary or fixed-position component 12 of a machine which may be, for example, a cylinder in which a piston moves. A plurality of electrically-isolated "position" electrodes, 13A, 13B, 13C - - - 13N, is formed, for example, on the interior face of component 12 along with a spaced-apart common electrode 15. A multiplexer 16 has an output connected to each of the position electrodes as shown in the figure.

An output of an excitation generator 17 is connected to the input of multiplexer 16. Also, outputs of logic circuit 19 are connected to inputs to multiplexer 16. Logic circuit 19 is operative to permit excitation interrogation of the position electrodes one at a time (in sequence) and to signal on its output (20) the position of the moving component such as the piston.

FIG. 1 also shows a moving shaft 21 which is connected to the piston. A "floating" pointer 22 is connected to the shaft and thus moves up and down as viewed, in concert with the movement of the piston. The pointer can be seen to bridge the space between the common electrode and the linear arrangement of position electrodes overlying one position electrode at a time as shown. The position electrode corresponding to the pointer produces a signal when interrogated.

The reason the signal is produced is due to the fact that the pointer is a metal element and forms two capacitors in series with the corresponding position electrode and the common electrode. An input to a detector 23 is connected to the common electrode ,15, and the output of detector 23 is connected to the input of logic circuit 19. The instant position of the piston is indicated at output 20 from logic circuit 19 as that of the position electrode (of the linear set of position electrodes) which produces a signal during an interrogation cycle. The output signal may be applied to a digital display or to a controller represented by block 24.

The arrangement of FIG. 1 includes both position electrodes and a common electrode on a non-moving component of a machine. In another embodiment only position electrodes need be formed on the non-moving component. The pointer may itself comprise the common electrode by being electrically connected to the detector. Such an arrangement is shown in FIG. 2 where a set 28 of position electrodes is attached to one component and the pointer 29 is connected to the other component (the moving one).

Figure 3:
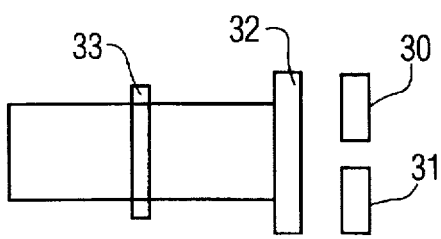
Figure 4:
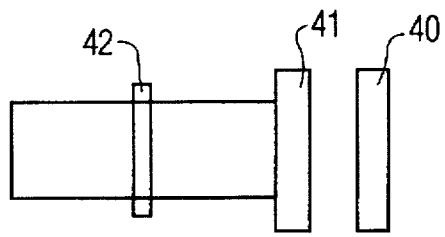

FIG'S. 3 and 4 show cross sectional views of the position electrodes and pointer organizations for the embodiments of FIG'S. 1 and 2. In FIG. 3, a position electrode 30 and the common electrode 31 are bridged by pointer 32 which moves with shaft 33. In FIG. 4, position electrode 40 is formed on one component (without the common electrode). Pointer 41 (the common electrode) moves with shaft 42.

FIG. 5 illustrates an embodiment where the rotational position of a moving (driven) component is measured with respect to an arcuate arrangement of position electrodes with respect to which it rotates as in this case, for example, in a vehicle throttle mechanism. FIG. 5 specifically illustrates the rotation of pointer 50 with shaft 51 of a throttle. The arrangement of position electrodes may be defined on the inner face of the sleeve within which the throttle rotates as indicated at 52 or on the inner face of a case attached to the throttle housing. The position electrodes are arranged from zero degrees (closed) to fully open, illustratively, in ten degree increments as shown in FIG. 5.

The degree of resolution shown in FIG'S. 1 or 5 can be defined arbitrarily by increasing the number of position electrodes and by any one of a number of coded positioning arrangements well known in the art.

It should be clear at this juncture that a technique useful for liquid level measurements and requiring the presence of a liquid for operation is adapted herein for measuring the position of a moving piece part in a machine in the absence of a liquid. The arrangement employs a pointer on the moving piece part with an air gap providing the insulation for the capacitor formed by an opposed position electrode and the pointer. Alternatively, the pointer may be affixed to the non-moving piece part with discrete electrodes on the moving piece part.

This approach may also employ an optical source (i.e. a laser) which may be attached to a non-moving piece part to, in effect, function as a pointer and coded indications 58 (i.e. a series of bar codes) could be attached to an associated movable piece part functioning as position "electrodes". A detector 59 (attached to the non moving piece) would then be operative as a bar code reader, where each bar code is associated with a specific position as represented in FIG. 6.

Alternatively, the codes of the embodiment of FIG. 6 may comprise magnetic stripes and the detector (59) may comprise a magnetic stripe read head.

The simple expedient of placing position indicators on a non-moving (or moving) component of a machine and the placement of a pointer (electrical, optical, or magnetic) on a moving (or non-moving) component of a machine not only provides an inexpensive and reliable position indicator for providing feedback, for example, for a digital hydraulic control system, but also provides a mechanism for sensing pressure, strain, force, acceleration, temperature or any other parameter that can be translated into a linear or rotational displacement.

Figure 7:
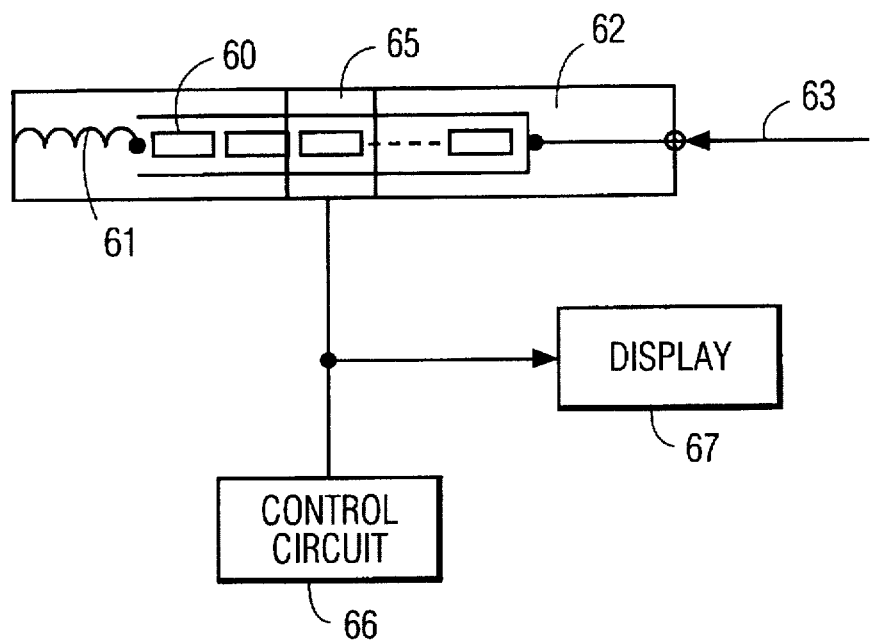

FIG. 7 illustrates an example in which pressure is sensed by a position sensor in accordance with the principles of this invention. The sensor, in this embodiment, includes a position-coded strip 60 spring loaded by spring 61 and free to move within cylinder 62 responsive to pressure applied in the direction of arrow 63. The pressure is applied in a direction to compress spring 61. Thus, coded strip 60 moves along the axis of cylinder 62. The sensor also includes, for example, a laser (and a detector) 65 affixed to cylinder 62 and operative under the control of control circuit 66 to read a position code on code strip 60. Code strip 60, in this embodiment, may be encoded in a manner analogous to the encoding of optical disks (compact disks).

Pressure (or force) can be applied directly to a shaft (arrow 63) and may be calibrated by the load (spring) on the position code strip. The applied pressure is indicated at display 67 in FIG. 7.

Figure 8:
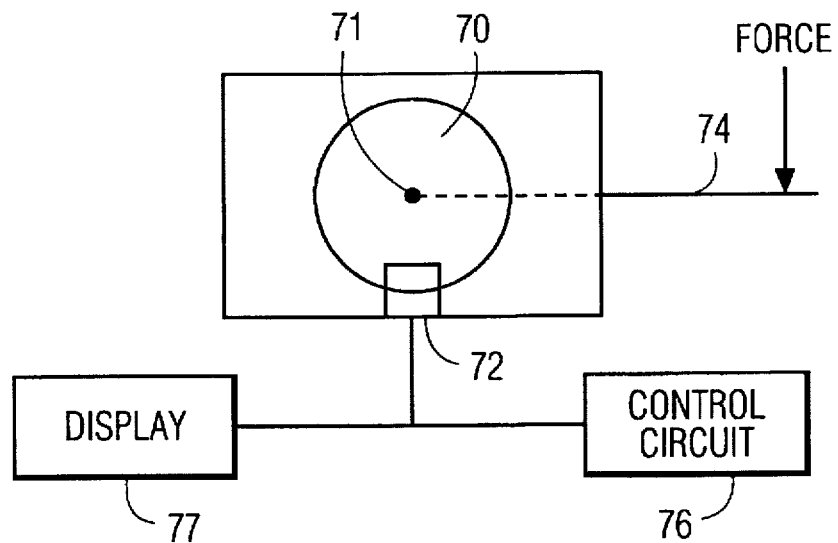

FIG. 8 illustrates an example wherein pressure (force) manifests itself by angular displacement. In the embodiment of FIG. 8, a position coded disk 70 rotates about on axis 71. Sensor 72 is positioned to read codes (not shown) arranged along the edge of disk 70. A lever arm (or gear assembly) represented by line 74 is connected to disk 70 to rotate the disk (against a load) to an angular position which is a function of the force applied. Once again, disk 70 is encoded, for example, as are optical disks, and sensor 72 is a laser (and a detector) operative, under the control of control circuit 76, to provide a pressure indication at display 77.

Position sensors, in accordance with the principles of this invention,are particularly useful, for example, in feedback loops for computer-controlled machine tools or digital hydraulic control systems.

What is claimed is:

1. Apparatus for sensing the position of a first piece part movable with respect to a second piece part of an assembly of at least two piece parts, said apparatus including a plurality of discrete elements secured to said second piece part along the direction of movement of said first piece part, said discrete elements providing a signal when activated, said apparatus also including a pointer, said pointer being affixed to said first piece part and being positioned adjacent different ones of said plurality of discrete elements as said first piece part moves, said apparatus also including means for activating said elements for providing a position indication only at the element corresponding to the position of said pointer.

2. Apparatus as in claim 1 wherein said discrete elements are electrodes and said pointer extends to successive ones of said discrete elements as said first piece part moves.

3. Apparatus as in claim 2 wherein said first piece part is a piston and said second piece part is a cylinder, said piston being movable along the direction of the center axis of said cylinder, said discrete elements being positioned on the inner face of said cylinder and aligned along the direction of said axis and said pointer being positioned on the outer face of said piston for indicating the position of said piston.

4. Apparatus as in claim 2 wherein said first piece part is a shaft rotatable in a sleeve, said discrete elements being positioned on the inner wall of said sleeve in an annular geometry and said pointer is affixed to the outer wall of said shaft for indicating the angular position of said shaft with respect to said sleeve.

5. Apparatus as in claim 1 wherein each of said discrete elements has a coded configuration and said pointer senses successive ones of said discrete elements for generating a coded indication of the position of said first element.

* * * * *